(12) United States Patent
Koike et al.

(10) Patent No.: US 8,967,880 B2
(45) Date of Patent: Mar. 3, 2015

(54) OPTICAL COLLIMATOR AND OPTICAL CONNECTOR USING SAME

(75) Inventors: Yasuhiro Koike, Yokohama (JP);
Hitoshi Suzuki, Yokohama (JP);
Hiroyuki Muto, Yokohama (JP);
Akihito Mitsui, Yokohama (JP);
Naohiko Moriya, Yokohama (JP);
Toshitaka Torikai, Tokyo (JP);
Takayoshi Yamauchi, Tokyo (JP)

(73) Assignees: Mitsubishi Pencil Company, Limited, Tokyo (JP); Japan Aviation Electronics Industry, Limited, Tokyo (JP); Yasuhiro Koike, Yokohama-shi (JP)

( * ) Notice: Subject to any disclaimer, the term of this patent is extended or adjusted under 35 U.S.C. 154(b) by 34 days.

(21) Appl. No.: 13/698,839

(22) PCT Filed: May 9, 2011

(86) PCT No.: PCT/JP2011/060667
§ 371 (c)(1),
(2), (4) Date: Feb. 27, 2013

(87) PCT Pub. No.: WO2011/145466
PCT Pub. Date: Nov. 24, 2011

(65) Prior Publication Data
US 2013/0156375 A1 Jun. 20, 2013

(30) Foreign Application Priority Data
May 19, 2010 (JP) ................................. 2010-114998

(51) Int. Cl.
G02B 6/38 (2006.01)
G02B 6/26 (2006.01)
(Continued)

(52) U.S. Cl.
CPC ................ *G02B 6/26* (2013.01); *G02B 6/4204* (2013.01); *G02B 7/022* (2013.01)
USPC .................................. 385/61; 385/74; 385/79

(58) Field of Classification Search
CPC .............................. G02B 7/022; G02B 6/3853
USPC ................................................ 385/61, 74, 79
See application file for complete search history.

(56) References Cited

U.S. PATENT DOCUMENTS 5,459,805 A * 10/1995 Foster .............................. 385/74
5,778,124 A * 7/1998 Nedstedt .......................... 385/79
(Continued)

FOREIGN PATENT DOCUMENTS

GB 2069170 A * 8/1981
JP 54-041249 U 3/1979
(Continued)

OTHER PUBLICATIONS

International Search Report of PCT/JP2011/060667, mailing date Jun. 14, 2011.
(Continued)

*Primary Examiner* — Charlie Y Peng
(74) *Attorney, Agent, or Firm* — Westerman, Hattori, Daniels & Adrian, LLP

(57) ABSTRACT

In order to fix an optical fiber to a desired position in a holding member easily and tightly, provided is an optical collimator (10) having a plastic optical fiber (13) and a cylindrical holder (11). The holder (11) is configured to hold a collimator lens (12) at an end and has an insertion hole (11*a*) at an opposite end for inserting the plastic optical fiber (13). The plastic optical fiber (13) is sandwiched by an inner surface of a recess (11*e*) which is formed at a part of the holder (11) in proper alignment with the collimator lens (12).

5 Claims, 9 Drawing Sheets

(51) Int. Cl.
*G02B 6/42* (2006.01)
*G02B 7/02* (2006.01)

(56) References Cited

U.S. PATENT DOCUMENTS

| | | | | |
|---|---|---|---|---|
| 5,810,713 | A * | 9/1998 | Rondeau et al. | 600/133 |
| 5,825,954 | A * | 10/1998 | Dunn et al. | 385/79 |
| 7,751,661 | B2 * | 7/2010 | Kadomi et al. | 385/36 |
| 2002/0191881 | A1 * | 12/2002 | Chen et al. | 385/11 |
| 2003/0138202 | A1 * | 7/2003 | Zhou et al. | 385/33 |
| 2004/0052475 | A1 * | 3/2004 | Deng et al. | 385/79 |
| 2012/0294573 | A1 * | 11/2012 | Kadar-Kallen et al. | 385/79 |

FOREIGN PATENT DOCUMENTS

| | | |
|---|---|---|
| JP | 60-161309 A | 10/1985 |
| JP | 62042108 A * | 2/1987 |
| JP | 2003098365 A * | 4/2003 |
| JP | 2006-343417 A | 12/2006 |

OTHER PUBLICATIONS

Japanese Office Action dated Jul. 2, 2013, issued in corresponding Japanese Patent Application No. 2010-114998, w/partial English translation.

* cited by examiner

OPTICAL COLLIMATOR AND OPTICAL CONNECTOR USING SAME

TECHNICAL FIELD

The present invention relates to an optical collimator used for gathering parallel light beams into an optical fiber and making light beams from the optical fiber parallel to each other, and to an optical connector using the optical collimator.

BACKGROUND ART

An optical collimator is used to make light emitted from a light source propagate through an optical fiber and, if necessary, into the air, or to input light propagating in the air into the optical fiber. Known as such an optical collimator is an optical collimator having a ferrule for holding a tip end of the optical fiber, a cylindrical holding member for holding the ferrule at an end thereof and a collimator lens which is held by the other end of the holding member (for example, see Patent Document 1).

CITATION LIST

Patent Literature

[Patent Literature 1] Japanese Patent Application Laid-Open No. 2006-343417

SUMMARY OF THE INVENTION

Technical Problem

However, in the above-mentioned conventional optical collimator, the optical fiber is fixed to an insertion hole of the ferrule with use of an adhesive agent or the like while coating of the tip end of the optical fiber ribbon is removed. The ferrule is held by being tightened to a sleeve fixed to the inside of the holding member by an adhesive agent or the like, and is fixed to this sleeve by an adhesive agent or the like, when necessary. That is, this optical collimator needs three adhesion operations at the maximum, and the operation for fixing the optical fiber position is problematically complicated.

Besides, in this optical collimator, the optical fiber is fixed to the holding member with use of plural members (ferrule and sleeve). When it happens that adhesion strength between any of members is reduced due to temperature change or the like, it becomes problematically difficult to keep the optical fiber fixed to the desired position.

The present invention was carried out in view of these problems and aims to provide an optical collimator and an optical connector using the same, the optical collimator being capable of fixing an optical fiber to a desired position in a holding member easily and tightly.

Solution to Problem

The optical collimator according to the present invention comprises: a plastic optical fiber; and a cylindrical holding member which is configured to hold a collimator lens at an end and has an insertion hole at an opposite end for inserting the plastic optical fiber, wherein the plastic optical fiber is sandwiched by an inner surface of a recess which is formed at a part of the holding member in proper alignment with the collimator lens.

According to the above-described optical collimator, as the plastic optical fiber is sandwiched by the inner surface of the recess formed in the holding member, it is possible to fix the plastic optical fiber only by deforming the holding member, without need to use any adhesive agent, thereby facilitating fixation of the plastic optical fiber to the holding member. Further, if the plastic optical fiber is fixed with use of any adhesive agent, there may arise the problem of reduction in adhesion strength due to temperature change or the like. According to the present invention, as the plastic optical fiber can be fixed by deforming the holding member, it is possible to prevent this problem and to fix the plastic optical fiber at the predetermined position tightly. Consequently, it becomes possible to fix the optical fiber to the desired position in the holding member easily and tightly.

Particularly, in the above-described optical collimator, it is preferable that the holding member is made of a metal material. As the holding member is made of the metal material, it is possible to perform pressing (including punching as described later) on the holding member efficiently and thereby to form the recess at a desired position of the holding member. Further, the metal material is preferably austenitic stainless steel in consideration of machinability and manufacturing cost.

Besides, in the above-described optical collimator, it is preferable that the recess comprises a plurality of recesses which is formed on one circumference of the holding member. In this aspect, as the plastic optical fiber is sandwiched by the plural recesses formed on the same circumference of the holding member, it is possible to fix the plastic optical fiber to the desired position of the holding member with reliability.

Particularly, in the above-described optical collimator, it is preferable that the recesses are provided in proximity to an end of a collimator lens side of the holding member. In this aspect, as the plastic optical fiber can be sandwiched by the recesses formed in proximity to the end of the collimator lens side of the holding member, it is possible to fix the plastic optical fiber in proximity to the collimator lens and thereby to fix the plastic optical fiber with high positioning accuracy with respect to the collimator lens.

Besides, in the above-described optical collimator, it is preferable that the recesses are provided in proximity of an end of an insertion hole side of the holding member. In this aspect, as the plastic optical fiber is sandwiched by the recesses formed in proximity to the end of the insertion hole side of the holding member, it is possible to fix the plastic optical fiber to the position away from the end of the collimator lens side of the holding member, the collimator lens requiring high positioning accuracy, and thereby to prevent the end of the collimator lens side of the holding member from being affected by the tensile force applied to the plastic optical fiber.

Besides, in the above-described optical collimator, it is preferable that the recess comprises a plurality of recesses formed collinearly along an insertion direction of the plastic optical fiber. In this aspect, it is possible to fix the plastic optical fiber to the desired position in the holding member with reliability, as well as to position the center of the optical fiber relative to the collimator lens highly accurately while preventing the plastic optical fiber being bent.

Further, in order to increase the fixation strength, an adhesive agent may be used concomitantly. In this aspect, the adhesive agent may be used to bond the outer surface of the optical fiber to the inner surface of the holding member or to fill an air gap between the collimator lens and the fiber end. In the latter case, the adhesive agent to use is preferably a transparent adhesive agent of which the refractive index is smaller than that of the collimator lens. Furthermore, a micro hole may be provided in the holding member at the position corresponding to the air gap in order to charge the adhesive agent. Still furthermore, the micro hole is not limited in number to one, but may be provided in plurality for discharging air during charging or discharging any volatile components generated during hardening.

The optical connector according to the present invention is configured to connect the optical collimator according to any one of the above-described aspects. According to this optical connector, it is possible to achieve the same operational effect as that of the above-described optical collimator.

Technical Advantage of the Invention

According to the present invention, as the plastic optical fiber is sandwiched by the inner surface of the recess provided in the holding member, it is possible to fix the plastic optical fiber only by deforming the holding member, without using any adhesive agent or the like, thereby facilitating fixation of the plastic optical fiber to the holding member. Besides, if the plastic optical fiber is fixed with use of an adhesive agent or the like, the adhesion strength is sometimes reduced problematically due to temperature change or the like. In the present invention, as the plastic optical fiber is fixed by deforming the holding member, it is possible to prevent such a problem of reduction in adhesive strength, thereby enabling tight fixation of the plastic optical fiber to the predetermined position. Accordingly, it becomes possible to fix the optical fiber to the desired position in the holding member easily and tightly.

DESCRIPTION OF EMBODIMENTS

Figure 1:
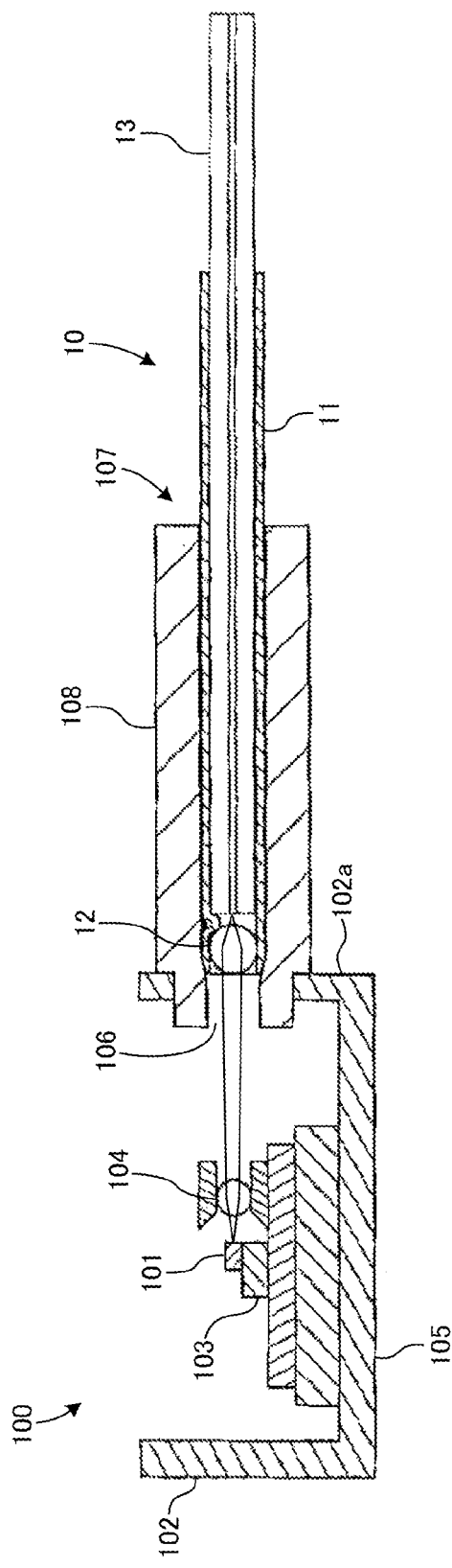
FIG. 1 is a lateral cross sectional view schematically illustrating an optical connector connected to an optical collimator according to the present invention.

Embodiments of the present invention will be specifically described in details with reference to the accompanying drawings. First description is made about an optical connector to which an optical collimator according to the present invention is connected. FIG. 1 is a lateral cross sectional view schematically illustrating the optical connector to which the optical connector according to the present invention is connected. In FIG. 1, for convenience of explanation, it is assumed that the optical connector has a semiconductor laser chip as a light source to output light to the optical collimator and an optical lens placed on the optical axis of the semiconductor laser chip. However, the structure of the optical connector is not limited to this, and may be modified appropriately. For example, the present invention is applicable not only to an optical connector on the transmission side using a semiconductor laser chip as described above, but also to an optical connector having a photo diode on the reception side for receiving light signals from the optical collimator and an optical lens placed on the optical axis on the photo diode.

As illustrated in FIG. 1, the optical collimator according to the present invention is connected to the optical connector 100, which has a semiconductor laser unit 105 having a semiconductor laser chip 101 arranged on a mount table 103 of a case 102 and an optical lens 104 arranged on the optical axis of the semiconductor laser chip 101. The optical connector 100 has an opening 106 formed in a side surface 102a of the case 102 and has an adaptor 108 for holding a holder 11 of the optical collimator 10 inserted via an insertion hole 107.

In the semiconductor laser unit 105, laser light beams output from the semiconductor laser chip 101 are made parallel with each other by the optical lens 104 and lead to the opening 106. Then, the parallel light beams from the optical lens 104 are gathered by a collimator lens 12 of the optical collimator 10 and are input to the plastic optical fiber 13. The thus inserted light propagates through the plastic optical fiber 13. This optical connector 100 is designed such that when the optical collimator 10 is inserted into a predetermined position of the adaptor 108, the optical lens 104 and the collimator lens 12 are positioned with respect to each other and laser light from the semiconductor laser chip 101 is input to the plastic optical fiber 13 appropriately. The following description is made about the structure of the optical collimator 10 according to this embodiment which is connected to such an optical connector 100.

Figure 2:
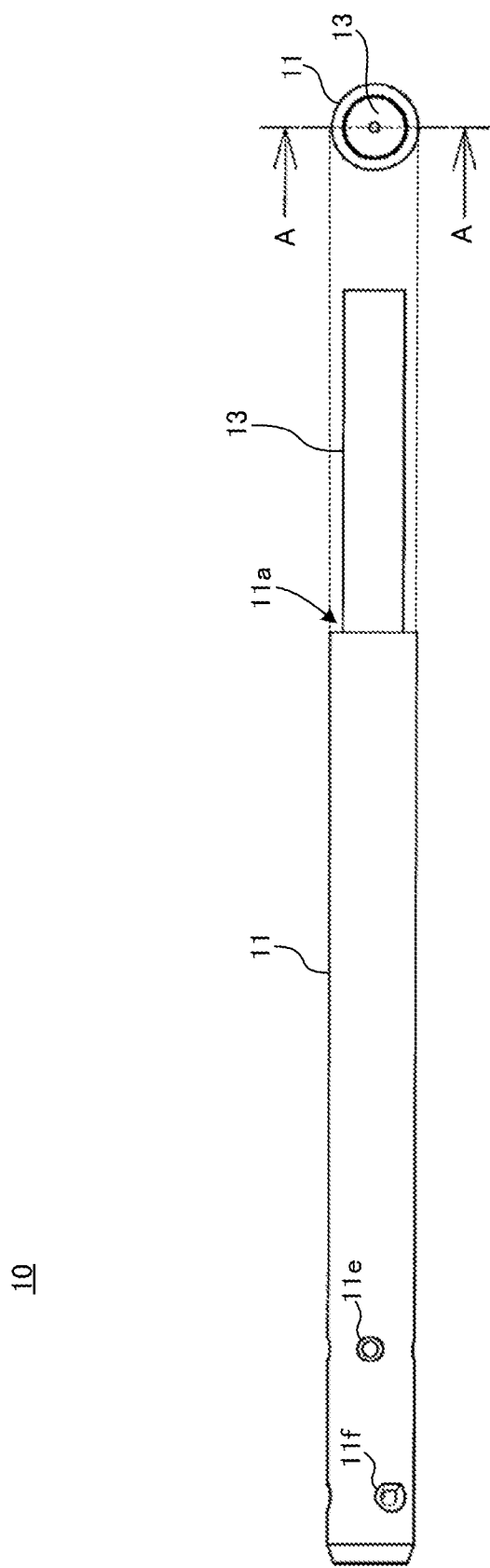
FIG. 2 is a side view of an optical collimator according to an embodiment of the present invention.
Figure 3:
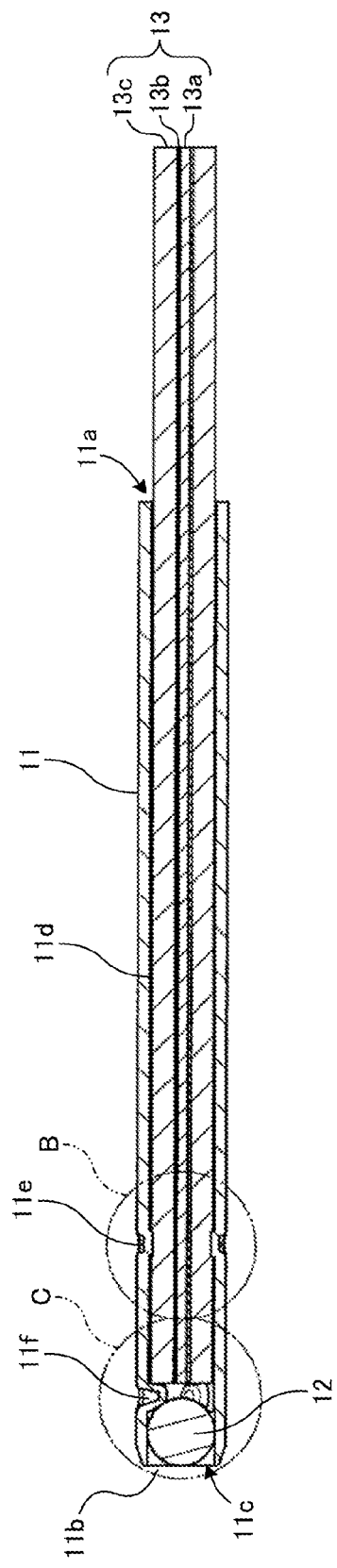
FIG. 3 is a cross sectional view taken along A-A of FIG. 2.

FIG. 2 is a side view of the optical collimator 10 according to an embodiment of the present invention. FIG. 3 is a cross sectional view taken along A-A of FIG. 2. As illustrated in FIG. 2, the optical collimator 10 according to this embodiment has the holder 11 as a holding member of approximately cylindrical shape, the collimator lens 12 which is supported by an end of this holder 11, and the plastic optical fiber (hereinafter referred simply to as "optical fiber") 13 inserted via an insertion hole 11a formed at the other end of the holder 11.

The holder 11 is, for example, formed of a metal material such as stainless steels. As illustrated in FIG. 3, an opening 11b is formed at an end of the collimator lens 12 side of the holder 11. Inside of this opening 11b, a housing part 11c is provided for housing the collimator lens 12. This housing part 11c is provided to be slightly smaller than the diameter of the collimator lens 12 so that the collimator lens 12 can be fit therein with pressure. The housing part 11c is designed to have such dimensions that the collimator lens 12 can be housed in entirely in order to prevent any damage to the surface of the collimator lens 12. In addition, inside the holder 11, a through hole 11d is provided which has a diameter slightly larger than the outer diameter of the optical fiber 13. This through hole 11d is provided communicating with the insertion hole 11a and also with the housing part 11c.

The collimator lens 12 is formed of glass or transparent plastic material and has a spherical ball lens. As illustrated in FIG. 3, while it is housed in the housing part 11c of the holder 11, the collimator lens 12 is arranged to face the opening 106 of the adapter 108 via the opening 11b and also face the tip end of the optical fiber 13 inserted via the through hole 11d.

The optical fiber 13 has a core 13a provided therethrough at its center, a cladding 13b covering the core 13a and a reinforcement layer 13c further covering the cladding 13b. This optical fiber 13 is, for example, a graded index (GI) optical fiber and is designed such that the refractive index varies continuously in a cross section orthogonal to the fiber axis. The core 13a and the cladding 13b are made of, for example, perfluorinated optical resin in which hydrogen of carbon-hydrogen bond is replaced with fluorine. As the optical fiber 13 is a GI optical fiber and is made of perfluorinated optical resin, it is possible to realize higher speed and large capacity communications.

In the optical collimator 10 according to the present invention, the optical fiber 13 includes an optical fiber having a core 13a and a cladding 13b both made of plastic material and an optical fiber having a core 13a made of glass and a cladding 13b made of plastic material.

The optical fiber 13 is inserted into the through hole 11d via the insertion hole 11a, and its tip end is arranged in proximity of the collimator lens 12 in such a manner as to face the spherical surface of the collimator lens 12. In this case, the optical fiber 13 receives light beams gathered by the collimator lens 12. Therefore, it is necessary to position the optical fiber 13 to face the collimator lens 12 with extremely high positioning accuracy and to fix the optical fiber 13 in such arrangement. To respond to these needs, in the optical collimator 10 according to this embodiment, when inserting the optical fiber 13 into the holder 11, the optical fiber 13 is first aligned, and the recesses 11e are formed at a part of the holder 11. Then, the optical fiber 13 is sandwiched by inner surfaces of these recesses 11e and fixed.

Here, description is made about a formation position of the recesses 11e in the optical collimator 10 according to the present embodiment. In the optical collimator 10 according to this embodiment, as illustrated in FIGS. 2 and 3, a plurality of recesses 11e is provided in proximity of an end of the collimator lens 12 side of the holder 11.

Figure 4A:
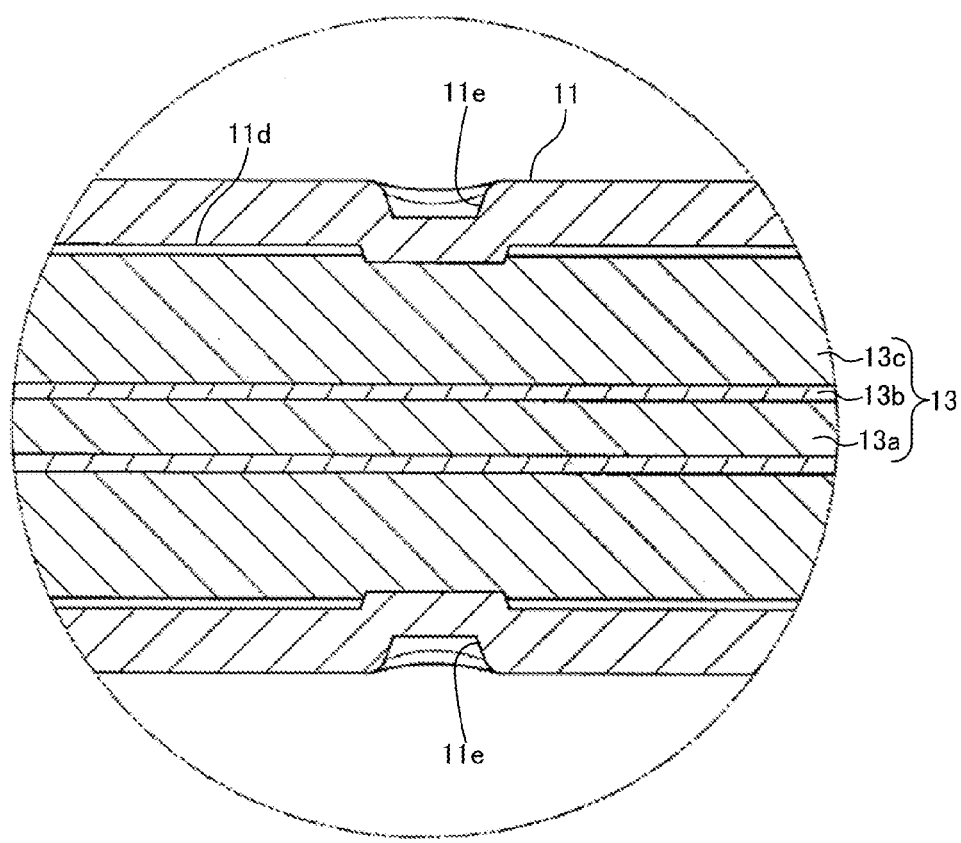
FIGS. 4A and 4B are enlarged views of the chain double-dashed line circles B, C of FIG. 3.

FIG. 4A is an enlarged view of the chain double-dashed line circle B of FIG. 3. As illustrated in FIG. 4A, in the optical fiber 13, the reinforcement layer 13c is sandwiched and held by the plural (four in this embodiment) recesses 11e provided equally spaced from each other on one circumference in proximity of the end of the collimator lens 12 side of the holder 11 (in FIG. 4A, the front-side and back-side recesses 11e are not illustrated in the figure. See FIG. 2).

In the optical collimator 10 according to the present embodiment, as the optical fiber 13 is supported by the plural recesses 11e provided in proximity of the end of the collimator lens 12 side of the holder 11 so that the optical fiber 13 can be fixed in proximity of the collimator lens 12. With this structure, it is possible to fix the core 13a and the cladding 13b while maintaining high positioning accuracy with respect to the collimator lens 12. Particularly, as the optical fiber 13 is sandwiched and held by the plural recesses 11e provided on the same circumference in the holder 11, it is possible to fix the optical fiber 13 to the predetermined position in the holder 11 with high reliability.

Here, as to the formation position of the recesses 11e, if it is closer to the collimator lens 12 than to the center of the holder 11, the same effect can be obtained as that of the case when the recesses are formed in proximity of the end of the collimator lens 12 side of the holder 11. That is to say, as the optical fiber 13 is supported by the recesses 11e positioned closer to the collimator lens 12 than to the center of the holder 11, it is possible to fix the optical fiber 13 to the position closer to the collimator lens 12 and also to fix the core 13a and the cladding 13b with high positioning accuracy with respect to the collimator lens 12.

These recesses 11e are formed, for example, by processing on the outer circumferential surface of the holder 11 with use of a punch (hereinafter referred to as "punching"). In the optical collimator 10 according to the present embodiment, punching is performed simultaneously at plural parts from the outside of the holder 11 thereby to form plural recesses 11e.

In this way, as the plural recesses 11e are formed at parts of the holder 11 by punching and the optical fiber 13 is sandwiched by the inner surfaces of the plural recesses 11e, it becomes possible to easily fix the optical fiber 13 to the desired position in the holder 11.

Besides, if the optical fiber 13 is fixed with use of an adhesive agent or the like, the adhesion strength may be lowered due to temperature change or the like. In the present invention, as the optical fiber 13 is sandwiched and fixed by the plural recesses 11e, it is possible to prevent such a situation, thereby securing the optical fiber at the predetermined position tightly.

Figure 4B:
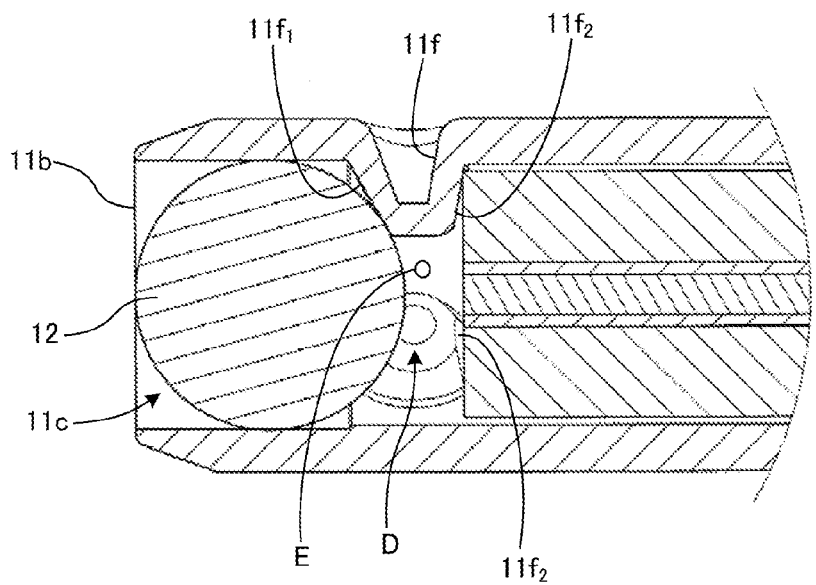

Further, in the holder 11, a plurality of positioning recesses 11f are provided as illustrated in FIG. 4B. These positioning recesses 11f are provided between the housing part 11c and the through hole 11d and used for positioning the collimator lens 12 and the optical fiber 13. Here, these positioning recesses 11f are formed, for example, by performing punching on the holder 11, like the recesses 11e.

At a part of a collimator lens 12 facing side of each positioning recess 11f, there is formed an inclined surface $11f_1$. As the inclined surface $11f_1$ is thus provided, positioning can be performed while a part of the optical fiber 13 side of the collimator lens 12 is supported, thereby enhancing the positioning accuracy of the collimator lens 12.

On the other hand, at a part of an optical fiber 13 facing side of the positioning recess 11f, there is formed an inclined surface $11f_2$. As the inclined surface $11f_2$ is thus provided, when the optical fiber 13 is structured such that end surfaces of the core 13a, the cladding 13b and the reinforcement layer 13c are in plane with each other, the end surface of the optical fiber 13 is made to abut to the positioning recess 11f, thereby facilitating positioning with high positioning accuracy.

In the above-described embodiment, the plural positioning recesses 11f are provided, however, this is not intended to limit the present invention. The positioning recess may be an annular recess formed entirely on the circumferential surface of the holder 11 between the housing part 11c and the through hole 11d.

Thus, according to the optical collimator 10 according to the present embodiment, as the optical fiber 13 is sandwiched between the inner surfaces of the recesses 11e provided in the holder 11 while it is positioned relative to the collimator lens 12. With this structure, the optical fiber 13 can be fixed only by deforming the holder 11 without use of any adhesive agent or the like, thereby facilitating fixation of the optical fiber 13 to the holder 11. Besides, as the optical fiber can be fixed by deforming the holder 11, it is possible to prevent the problem of reduction in adhesive strength due to temperature changes or the like, which is caused when the optical fiber 13 is fixed with use of an adhesive agent or the like, and to secure the optical fiber 13 to the fixed position tightly. Consequently, it is possible to secure the optical fiber 13 to the desired position in the holder 11 easily and tightly.

Particularly, in the optical collimator 10 according to the present embodiment, as the holder 11 is made of a metal material such as stainless steels, it is possible to perform pressing (punching) on the holder 11 efficiently and to form the recesses 11e at desired positions of the holder 11 easily.

Here, in the optical collimator 10 according to the present embodiment, the plural recesses 11e are arranged near the end of the collimator lens 12 side of the holder 11, and the optical fiber 13 is fixed by these recesses 11e. However, the formation parts of the recesses 11e are not limited to these and may be modified appropriately.

Figure 5:
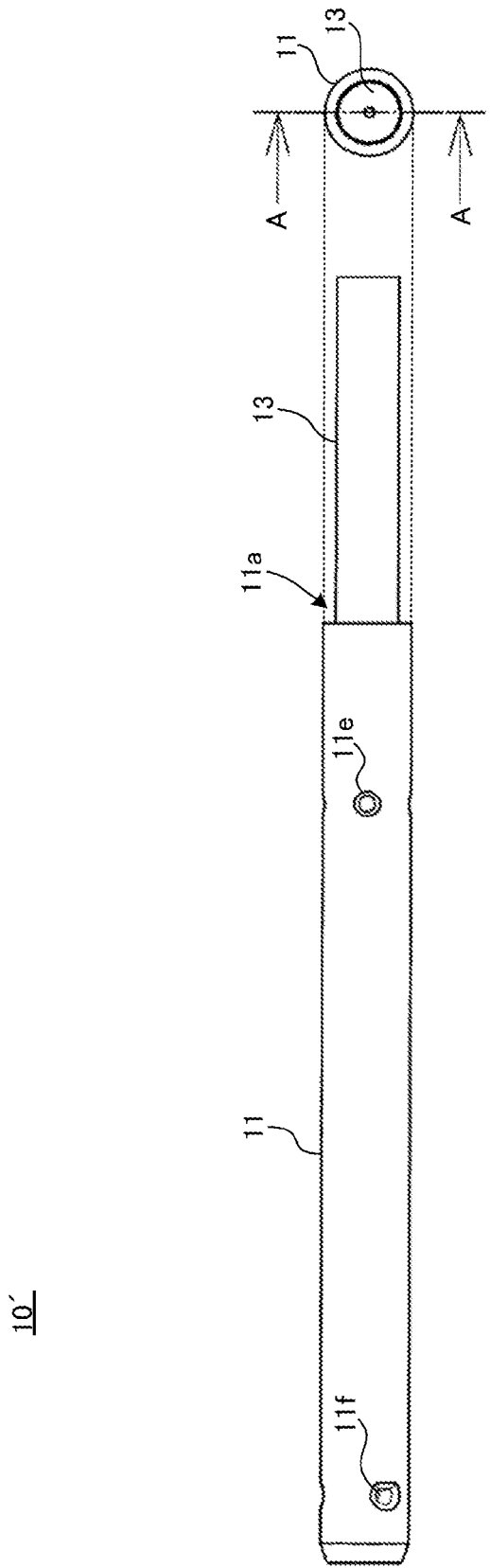
FIG. 5 is a side view of an optical collimator according to a modified example of the above-described embodiment.
Figure 6:
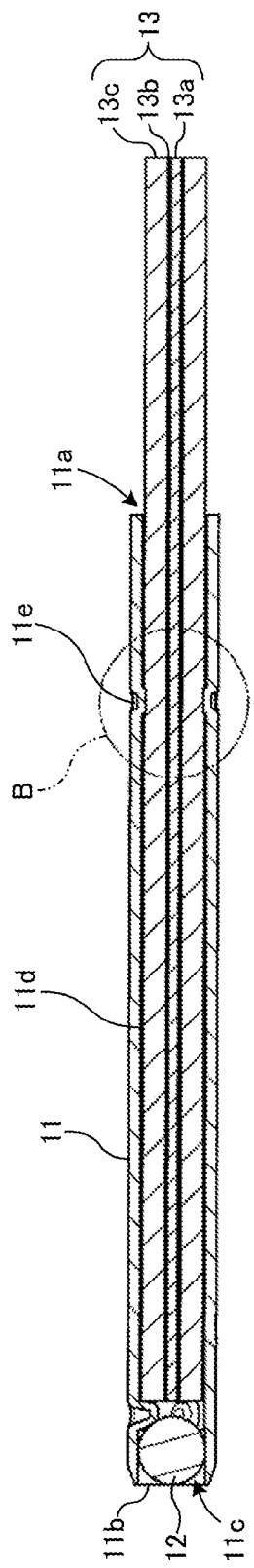
FIG. 6 is a cross sectional view taken along A-A of FIG. 5.

Next description is made about the structure of an optical collimator 10' according to a modified example of the present embodiment. FIG. 5 is a side view of the optical collimator 10' according to the modified example of the present embodiment. FIG. 6 is a cross sectional view taken along A-A illustrated in FIG. 5. In FIGS. 5 and 6, the like elements to those in FIGS. 2 and 3 are denoted by the like reference numerals and their description is omitted here.

As illustrated in FIGS. 5 and 6, in the optical collimator 10' according to the modified example of the present embodiment, the plural recesses 11e are provided near the end of the insertion hole 11a side of the holder 11. That is to say, in the optical collimator 10', the optical fiber 13 is sandwiched and fixed by the inner surfaces of the plural recesses 11e formed near the end of the insertion hole 11a side of the holder 11. Here, the formation method of these recesses 11e is the same as that of the optical collimator 10 according to the present embodiment.

Figure 7:
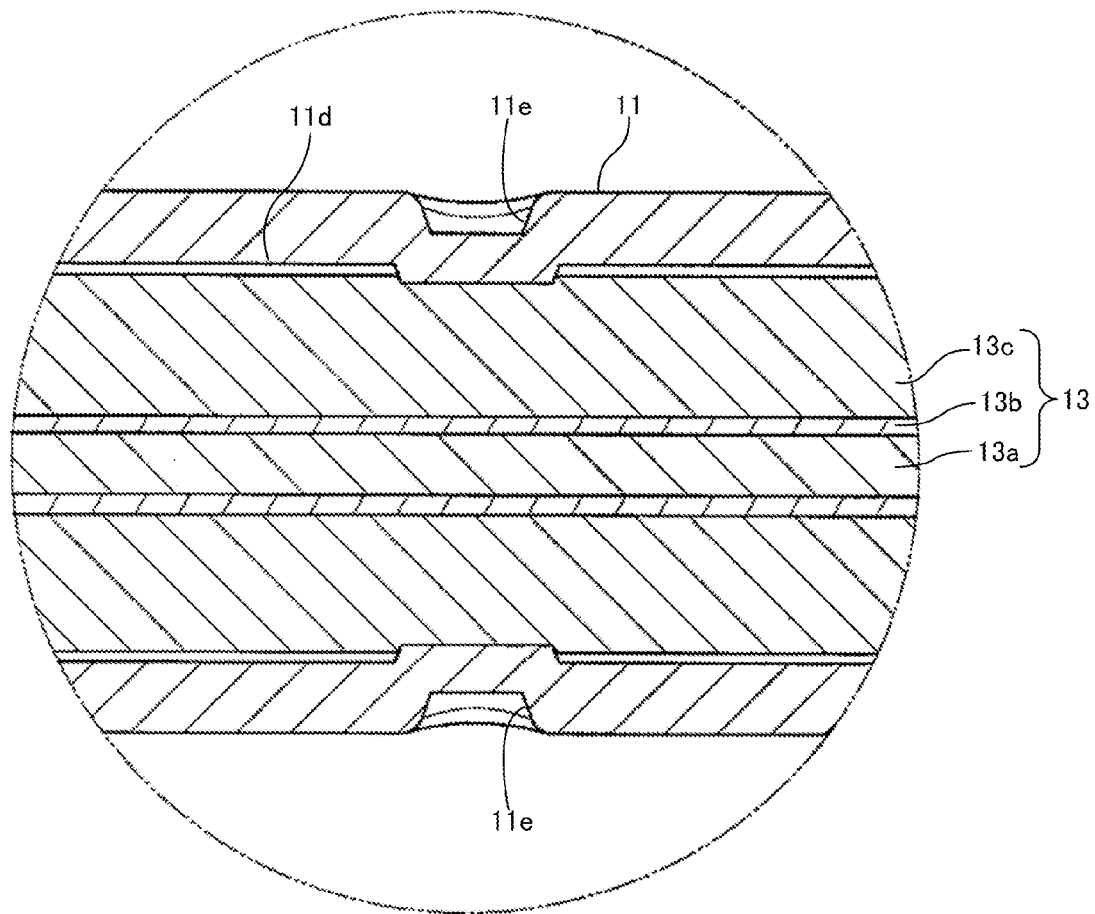
FIG. 7 is an enlarged view of the chain double-dashed line circle B of FIG. 6.

FIG. 7 is an enlarged view of the chain double-dashed line circle B illustrated in FIG. 6. As illustrated in FIG. 7, the optical fiber 13 is arranged near the end of the insertion hole 11a side of the holder 11 with the reinforcement layer 13c sandwiched by the plural (four in this embodiment) recesses 11e provided on the same circumference equally spaced from each other (in FIG. 7, front-side and back-side recesses 11e are not illustrated. See FIG. 5). In this way, as the plural recesses 11e formed near the end of the insertion hole 11a side of the holder 11 are used to sandwich the optical fiber 13, it is possible to fix the optical fiber 13 at the position away from the end of the collimator lens 12 side that requires high positioning accuracy, and thereby to prevent the tip end of the optical fiber 13 (tip end facing the collimator lens 12) from being affected by the tensile force applied to the optical fiber 13.

Here, as to the formation position of the recesses 11e, they are provided at the position closer to the insertion hole 11a than to the center of the holder 11. With this configuration, the same effect can be obtained as that in the case where the recesses are provided near the end of the insertion hole 11a side. That is to say, as the optical fiber 13 is sandwiched by the recesses 11e provided at the positions closer to the insertion hole 11a than to the center of the holder 11, it is possible to fix the optical fiber 13 at the position away from the end of the collimator lens 12 side that requires high positioning accuracy, thereby preventing the tip end of the optical fiber 13 (tip end facing the collimator lens 12) from being affected by the tensile force applied to the optical fiber 13.

The present invention is not limited to the above-described embodiments, and may be embodied in various modified forms. In the above-described embodiments, the sizes and shapes illustrated in the accompanying drawings are not intended to restrict the scope of the present invention, and may be modified appropriately as far as the effect of the present invention can be exerted. And, other modification may be also added appropriately without departing from the scope of the present invention.

For example, in the above-described embodiment, the recesses 11e are provided in proximity to the end of the collimator lens 12 side of the holder 11, and in the modified example of the embodiment, the recesses 11e are provided in proximity of the end of the insertion hole 11a side of the holder 11. However, the position of the recesses 11e is not limited to this and may be modified appropriately. For example, it is preferable as an embodiment that the recesses 11e are provided both at the end of the insertion hole 11a side and at the end of the collimator lens 12 side of the holder 11. In this case, the effects of both of the optical collimator 10 according to the present embodiment and the optical collimator 10' according to the modified example can be obtained. In addition, the recesses 11e may be provided at positions other than the positions in proximity to the end of the holder 11.

Figure 8:
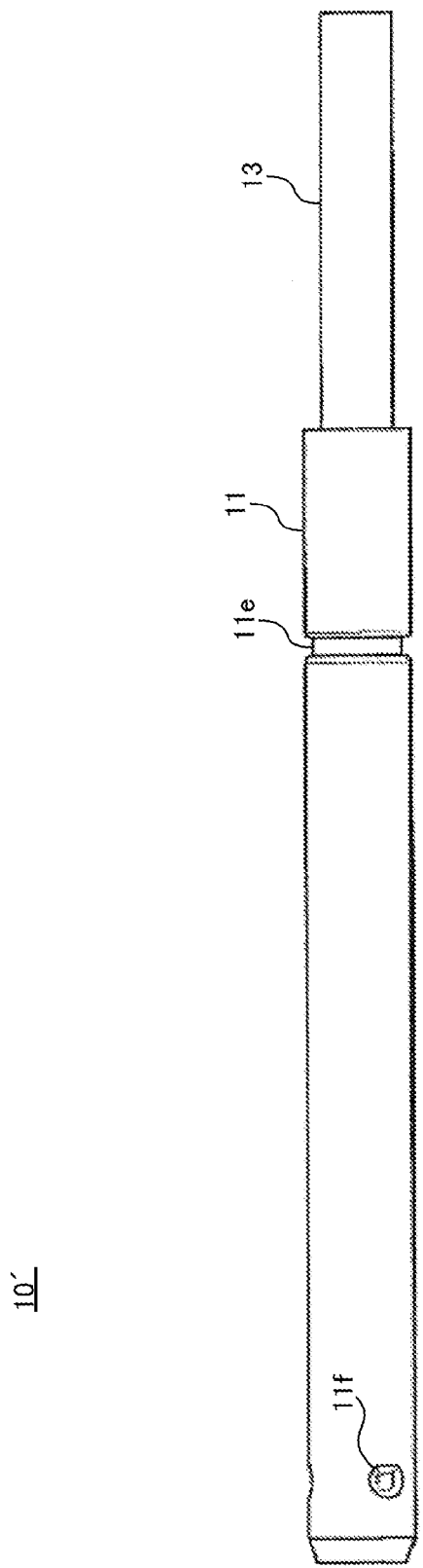
FIG. 8 is a side view of an optical collimator according to a modified example of the above-described embodiment.

In addition, in the above-described embodiment, it is assumed that the recesses 11e are provided in plurality. However, the shape of the recess 11e is not limited to that of the embodiment and may be modified appropriately. For example, the recess 11e is an annular recess provided on the entire circumferential surface of the holder 11. FIG. 8 is a side view of the optical collimator 10' provided with the recess 11e which is the annular recess provided on the entire circumferential surface of the holder 11. As the recess 11 is thus provided as the annular recess formed on the entire circumferential surface of the holder 11, it is possible to support the optical fiber 13 by its entire outer surface, thereby enabling more reliable fixation.

Figure 9:
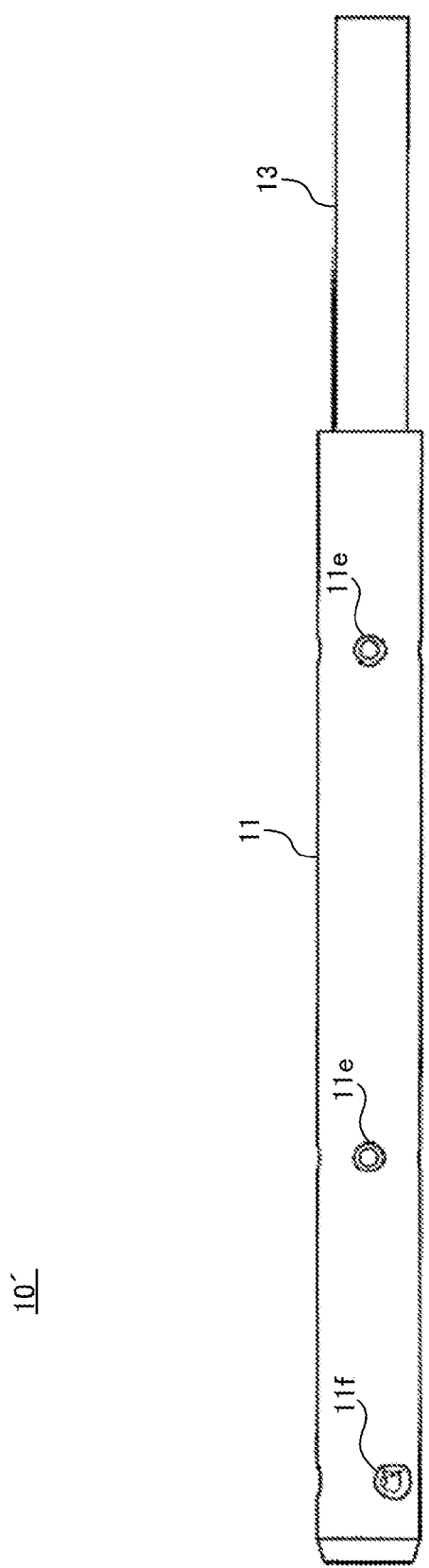
FIG. 9 is a side view of an optical collimator according to another modified example of the above-described embodiment.

Further, in the above-described embodiment, it is assumed that a single recess 11e is provided in the insertion direction of the optical fiber 13. However, plural recesses 11e may be provided collinearly along the insertion direction of the optical fiber 13. FIG. 9 is a side view of the optical collimator 10' in which the plural recesses 11e are provided collinearly along the insertion direction of the optical fiber 13. When the plural recesses 11e are provided collinearly along the insertion direction of the optical fiber 13, it is possible to fix the optical fiber 13 to the desired position in the holder 11 with reliability, as well as to position the center of the optical fiber 13 relative to the collimator lens 12 with high positioning accuracy, while preventing the optical fiber 13 being bent.

Furthermore, an adhesive agent may be used to increase the fixation strength of the optical fiber 13 and the collimator lens 12 to the holder 11. In this case, the adhesive agent may be used to bond the inner surface of the holder 11 to the outer surface of the optical fiber 13 or may be filled in an air gap between the end of the optical fiber 13 and the collimator lens 12 (see the air gap D illustrated in FIG. 4). In the latter case, the adhesive agent used is preferably a transparent adhesive agent of which the refractive index is smaller than that of the collimator lens 12. Besides, in order to charge the adhesive agent, a micro hole may be formed in the holder 11 at the position corresponding to the air gap (see the micro hole E illustrated in FIG. 4). This micro hole is not limited in number to one but may be provided in plurality for discharging volatile components generated during hardening or air during charging.

Furthermore, in the above-described embodiment, it is assumed that the recesses 11e are formed at a part of the holder 11 by punching. However, the formation method of the recesses 11e is not limited to this, and may be modified appropriately. For example, each recess 11e may be formed by thermal deformation of a part of the holder 11. If the recesses 11e are thus formed, the same effect as that in the present embodiment can be obtained.

Still furthermore, in the above-described embodiment, it is assumed that the recesses 11e are formed at three points on the same circumference of the holder 11. However, the number of the recesses 11e formed on the holder 11 is not limited to this and may be modified appropriately.

Still furthermore, for the purpose of further increasing the strength of fixation of the optical fiber 13 to the holder 11, the outer surface of the optical fiber 13, that is, the reinforcement layer 13c (cladding 13b if no reinforcement layer exists) may be fusion bonded to the holder 11. The concrete method for fusion bonding to select includes a method of heating the holder 11 directly by a heater or the like and a method of heating the holder 11 by electromagnetic induction.

The present application is based on Japanese Patent Application No. 2010-114998 filed on May 19, 2010, entire content of which is expressly incorporated by reference herein.

The invention claimed is:

1. An optical collimator comprising:
   a plastic optical fiber; and
   a cylindrical holding member which is configured to hold a collimator lens at an end and has an insertion hole at an opposite end for inserting the plastic optical fiber,
   wherein the plastic optical fiber is sandwiched by an inner surface of a recess which is formed at a part of the holding member in proper alignment with the collimator lens,
   the collimator lens and the plastic optical fiber are positioned so that the collimator lens and the plastic optical fiber abut to inclined surfaces of a positioning recess formed at another part of the holding member,
   the holding member is made of a metal material, and
   the recess comprises a plurality of recesses which is formed on one circumference of the holding member.

2. The optical collimator according to claim 1, wherein the recesses are provided in proximity to an end of a collimator lens side of the holding member.

3. The optical collimator according to claim 1, wherein the recesses are provided in proximity of an end of an insertion hole side of the holding member.

4. The optical collimator according to claim 1, wherein the recess comprises a plurality of recesses formed collinearly along an insertion direction of the plastic optical fiber.

5. An optical connector for connecting the optical collimator according to any one of claims 1, 2, 3 or 4.

* * * * *